(12) United States Patent
Rosado Loria et al.

(10) Patent No.: US 9,591,872 B2
(45) Date of Patent: Mar. 14, 2017

(54) NUTRITIONAL COMPOSITION FOR CHILDREN WITH REFLUX, COLIC AND/OR CONSTIPATION

(75) Inventors: Jorge Luis Rosado Loria, Querétaro (MX); Miguel Angel Duarte-Vázquez, Querétaro (MX)

(73) Assignee: Nucitec S.A. de C.V., Colonia Penuelas (MX)

( * ) Notice: Subject to any disclaimer, the term of this patent is extended or adjusted under 35 U.S.C. 154(b) by 0 days.

(21) Appl. No.: 13/559,195

(22) Filed: Jul. 26, 2012

(65) Prior Publication Data

US 2013/0189398 A1    Jul. 25, 2013

(30) Foreign Application Priority Data

Jul. 26, 2011   (MX) .................. MX/A/2011/007872

(51) Int. Cl.
 *A23L 33/10*   (2016.01)
(52) U.S. Cl.
 CPC .................................. *A23L 33/40* (2016.08)
(58) Field of Classification Search
 CPC ................................ A23L 1/296; A23L 1/305
 USPC ........................................................ 426/71
 See application file for complete search history.

(56) References Cited

U.S. PATENT DOCUMENTS

| | | | |
|---|---|---|---|
| 4,670,268 A | 6/1987 | Mahmoud | |
| 5,021,245 A | 6/1991 | Borschel et al. | |
| 5,192,577 A | 3/1993 | Masson | |
| 5,681,600 A | 10/1997 | Antinone et al. | |
| 6,099,871 A * | 8/2000 | Martinez | 426/2 |
| 6,365,218 B1 | 4/2002 | Borschel et al. | |
| 6,863,918 B2 | 3/2005 | Bindels et al. | |
| 6,913,778 B2 | 7/2005 | Kuhlman et al. | |
| 7,157,616 B2 * | 1/2007 | Elliott et al. | 800/15 |
| 7,618,669 B2 * | 11/2009 | Rangavajla et al. | 426/583 |
| 2003/0165606 A1 | 9/2003 | Lasekan et al. | |
| 2005/0058690 A1 * | 3/2005 | Burgher et al. | 424/439 |
| 2005/0142249 A1 | 6/2005 | Davis et al. | |

FOREIGN PATENT DOCUMENTS

WO  WO 2009/068549   *  4/2009

OTHER PUBLICATIONS

Davis et al. "Alpha-Lactalbumin-rich infant formula fed to healthy term infants in a nulticenter study: plasma essential amino acids and gastrointestinal tolerance" in Europena Journal of Clinical Nutrition (2008), 62, p. 1294-1301.*
Brizee ("Summary of Formulas used for Nutritional Support of Infants"—www.courses.washington.edu/nutri526/news/Infant_Formulas_05.doc, updated Jun. 2004).*

(Continued)

*Primary Examiner* — Elizabeth Gwartney
(74) *Attorney, Agent, or Firm* — Sterne, Kessler, Goldstein & Fox P.L.L.C.

(57) ABSTRACT

The present invention is directed to an infant formula specially designed to reduce episodes of regurgitation, colic and constipation that occur in infants fed on infant formula. The composition represents a needed improvement to the art because it contains in a single composition substances that simultaneously addresses these three problems.

21 Claims, 3 Drawing Sheets

Figure 1:
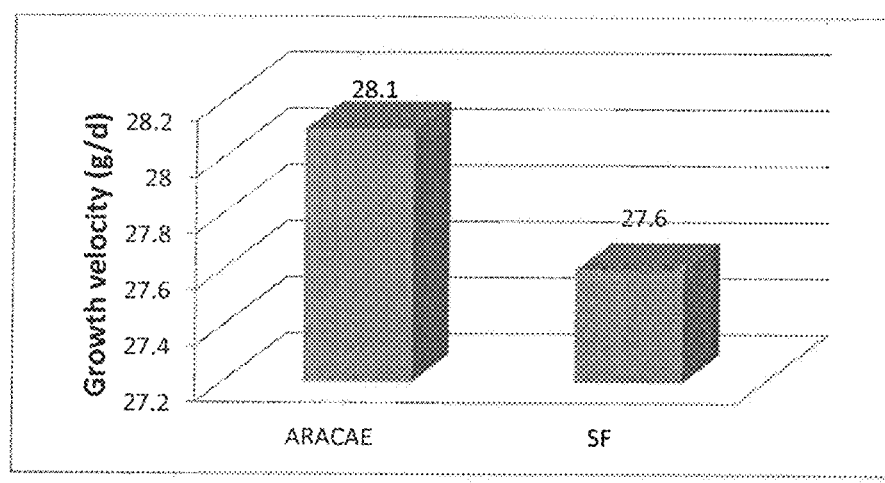

Incidence of GI events in both feeding groups

(56) References Cited

OTHER PUBLICATIONS

Koletzko et al. "Global Standards for the Composition of Infant Formula: Recommendations of an ESPGHAN Coordinated International Expert Group"—in Journal of Pediatric Gastroenterology and Nutrition, vol. 41, No. 5, Nov. 2005, p. 584-599.*
Lien et al. "Growth and Safety in Term Infants Fed Reduced-Protein Formula with Added Bovine alpha-Lactalbumin" in Journal of Pediatric Gastroenterology and Nutrition (2004), 38, p. 170-176.*
Bock, "Prospective Appraisal of Complaints of Adverse Reactions to Foods in Children During the First 3 Years of Life," *Pediatrics* 79(5):683-688, American Academy of Pediatrics, United States (1987).
Corvaglia, L., et al., "The Effect of Body Positioning on Gastroesophageal Reflux in Premature Infants: Evaluation by Combined Impedance and pH Monitoring," *J Pediatr 151*: 591-596, Mosby Inc., United States (2007).
Guillet, R., et al., "Association of H2-Blocker Therapy and Higher Incidence of Necrotizing Enterocolitis in Very Low Birth Weight Infants," *Pediatrics* 117(2):e137-e142, American Academy of Pediatrics, United States (2006).
Hill, D.J. and Hosking, C.S., "Infantile Colic and Food Hypersensitivity," *Journal of Pediatric Gastroenterology and Nutrition* 30:S67-S76, Lippincott Williams & Wilkins, Inc., United States (2000).
Høst, A. and Halken, S., "A prospective study of cow milk allergy in Danish infants during the first 3 years of life," *Allergy 45*:587-596, Wiley-Blackwell, Denmark (1990).
Jakobsson, I., et al., "Effectiveness of casein hydrolysate feedings in infants with colic," *Acta Pædiatr 89*:18-21, Scandinavian University Press, Norway (2000).
Lucassen, P.L.B.J., et al., "Infantile Colic: Crying Time Reduction With a Whey Hydrolysate: A Double-Blind, Randomized, Placebo-Controlled Trial," *Pediatrics* 106(6):1349-1354, American Academy of Pediatrics, United States (2000).
Savino, F., et al., "Reduction of crying episodes owing to infantile colic: a randomized controlled study on the efficacy of a new infant formula," *European Journal of Clinical Nutrition 60*:1304-1310, Nature Publishing Group, England (2006).
Schrander, J.J.P., et al., "Cow's milk protein intolerance in infants under 1 year of age: a prospective epidemiological study," *Eur J Pediatr 152*:640-644, Springer-Verlag, Germany (1993).
Shalaby, T.M. and Orenstein, S.R., "Efficacy of Conservative Therapy in Infants with Gastroesophageal Reflux Disease Referred by Pediatricians to Pediatric Gastroenterologists," *Gastroenterology 120(5), Supplement 1*:A49, 254, Elsevier Inc., United States (2001).

* cited by examiner

Growth velocity by feeding group

Incidence of GI events in both feeding groups

NUTRITIONAL COMPOSITION FOR CHILDREN WITH REFLUX, COLIC AND/OR CONSTIPATION

BACKGROUND OF THE INVENTION

Field of the Invention

The current invention is in the field of nutrition and infant formulas for special purposes. More specifically, the invention is related to a composition for use as a feeding formula for children from 0 to 12 months old. Said formula has more tolerability and significantly decreases the adverse events produced by other formulas. More specifically, the composition of the invention is a new and improved food choice for children who exhibit symptoms of gastroesophageal reflux, abdominal colic and/or constipation.

Background Art

It is well known that the best way of feeding a newborn or an infant is by administering the milk of his own mother. In many cases this is not possible for many reasons, mainly because of the job activity of the mother or due to a physiological impairment that do not allow breast feeding. In these cases, the baby should be fed with a formula made from cow's milk. According to the National Nutrition Survey (2006), about 75% of the infants younger than four months were breastfed partly or fully with breast milk substitutes or infant formula. Generally, these formulas are well tolerated, but about 4 to 5% of the children in the first year of life according with some authors (Bock S A. Prospective appraisal of complaints of adverse Reactions to foods in children during the first three years of life. *Pediatric* 1987; 79:683-688.), or about 2 to 5% according with other authors (Host A, Halken S A. A prospective study of cow's milk allergy in Danish infants during the first Three years of life. Clinical course in relation to clinical and immunological type of hypersensitivity reaction. *Allergy* 1990, 45:587-596; Schrander J J P, Van Den Bogart J P H, Forget P P et al. Cow's milk protein intolerance in infants under 1 year of age: a prospective epidemiological study. *Eur J Pediatr* 1993; 152: 640-644), experience some form of gastrointestinal disorder with the use of these formulas. Infants consuming these formulas may suffer decreased appetite and/or regurgitation; additionally, changes in the natural process of gastric emptying, colic and intolerance to the formula components may occur.

One of these high prevalence disorders especially in children under 1 year of age is gastroesophageal reflux or regurgitation. Regurgitation occurs when gastric content escapes from the stomach into the upper digestive tract moving in the opposite direction to normal movement of food. Some authors report a high incidence of reflux reaching values of 67% among children under 4 months old. The figures may vary since the diagnosis of the disease involves the perception of the parents. In Mexico, data from the Mexican Academy of Pediatrics suggests that this condition occurs in 40% of children during the first months of life resulting in most of the cases in charges to families for healthcare.

Gastroesophageal reflux is common in newborns due to some factors such as gastrointestinal immaturity, high consumption of milk and inappropriate body postures. Gastroesophageal reflux is the cause of high morbidity, prolonged stays in hospital and has been associated with other disorders such as apnea, worsening of chronic diseases and other complications such as aspiration of gastric contents and oesophagitis (Corvaglia, L., Rotatori, R., Ferlini, M., Aceti, Ancora, G., Faldella, G. The effect of body positioning on gastroesophageal reflux in premature infants: evaluation by combined impedance and pH monitoring, *J Pediatr* 2007; 151: 691-6). An inadequate treatment exposes the child to undergo more regurgitation, resulting in more serious clinical manifestations, among them failure to thrive, recurrent respiratory infections and sometimes other life threatening events.

For preterm infants with oesophageal reflux, the treatment initially includes conservative interventions, related to body position. Also anti-reflux medications such as histamine receptor blockers-2 (H2) are commonly used during hospitalization and after discharge. However, clinical evidence has shown that the administration of these drugs increase the risk of necrotizing enterocolitis as well as the risk of an eventual sepsis (Guillet, R., Stoll, B J., Cotton, C M, et al. Association of H2-blocker therapy and higher incidence of necrotizing enterocolitis in very low birth weight infants. *Pediatrics* 2006 117: e137-42). Other drugs such as metoclopramide cause serious adverse effects including irritability of digestive tract, diastonic reactions, vomiting, emesis, and apnea.

Since the volume, osmolarity, caloric density, viscosity, nutrient content and the digestibility of the food may influence the appearance or disappearance of reflux events, the use of an appropriate diet is the main form of intervention and treatment of the gastroesophageal reflux disease. There is evidence in the literature that intervention with an appropriate diet without the use of drugs is effective to reduce reflux in infants (Shalaby T M, Orenstein S R. Efficacy of conservative therapy in infants with gastroesophageal reflux disease referred by pediatricians to pediatric gastroenterologists. *Gastroenterology.* 2001; 120:A49).

The most effective option to treat this condition is the use of infant formula with thickeners which increase viscosity. Some agents such as locust bean gum, carboxymethylcellulose, and compounds containing pectin and cellulose have been used with this objective, however, there is a high risk of decreasing the bioavailability of some nutrients with the use of these compounds.

Infant formulas recommended for infants with gastroesophageal reflux are found in the prior art, some of which are described below:

Masson (U.S. Pat. No. 5,192,577) describes the use of xanthan gum in nutritional formulations; restricting its application to a stabilizer, but does not focus on solving intolerance problems.

Anfinone et al. (U.S. Pat. No. 5,681,600) describes the use of xanthan gum in a nutritional formula, however the use of this gum is considered inadequate due to the observation of a limited absorption of calcium.

Mahmoud (U.S. Pat. No. 4,670,268) describes the use of a hypoallergenic nutritional formula which may contain xanthan gum as a stabilizer. Nevertheless the patent does not claim the effective amount of xanthan gum used to produce an increase in viscosity.

There are in the market some formulas for children with regurgitation problems which incorporate gums as thickening agents, such us Nutrilon AR, Blemil Plus 1 and 2 AR; Nutriben 1 and 2 AR, and Enfalac 1 and 2 AR.

Borshel et al. (U.S. Pat. No. 6,365,218 B1) suggests a significant improvement in these formulas, through the addition of vitamins and minerals to compensate for the loss of these elements that take place with the use of xanthan gum.

Some formulations have used rice starch as a thickening agent, which contains from 17-24% amylose and 76-83% amylopectin. Amylopectin is less digestible than amylose, therefore formulas containing corn starch and/or rice starch will be less digestible due to high concentration of amylopectin. Potato starch, which belongs to the amilacias family possess higher concentration of amylose (from 50 to 70%) and less content of amylopectin (from 50 and 30%), therefore, a better tolerance results with the use of this starch. Some authors have replaced the use of rice starch or corn starch for potato starch (Martinez, U.S. Pat. No. 6,099,871).

Most studies focused on reducing regurgitation in infants have used viscosity-increasing agents, however, few of them have evaluated the impact of lactose reduction. Only Lasekan et al. (US Published Application 2003/0165606 A1) has proposed that a reduction of 70% or less in lactose levels of a total carbohydrates in infant formulas, may relieve regurgitation events that occur within the first months of life.

Besides the use of thickeners, other modifications such as increasing the casein content have been proposed as an option to relieve regurgitation events. This approach is due to the ability of casein to increase the density of rennet, reducing regurgitation but it delays gastric emptying, which can lead to constipation problems.

During reflux episodes, some other alterations occur simultaneously, such as stomach pain or colic and constipation; however, with the infant formulas developed to date it is not possible to treat all these problems simultaneously.

Colic is a common problem in childhood. Numerous reports in the pediatric literature suggest that this condition occurs between 10 and 30% of formula-fed infants. Colic in infants is detected by the presence of unexpected episodes of crying and whining which occur mainly at night. Despite the high incidence of colic and the vast amount of investigation that has been developed in this regard, its etiology has not been clearly elucidated. There is considerable evidence suggesting that colic is related to some type of food allergy and sometimes is the first manifestation of atopic dermatitis, however this correlation has not been fully elucidated (Schrander J J P, Van Den Bogart J P H, Forget P P et als. Cow's milk protein intolerance in infants under 1 year of age: a prospective epidemiological study. *Eur J Pediatr* 1993; 152: 640-644; Hill, D, and Hosking, C S. Infantile colic and food hypersensitivity. *Journal of Pediatric Gastroenterology* 2000; 30 (1): s67-s76). For cases where it is believed that colic is related to allergy to intact protein, formulas based on partially or extensively hydrolyzed protein have been developed (Jakobsson I, Lothe L, Ley D, Borschel M W. Effectiveness of cassein hydrolysates feedings in infants with colic. *Acta Pediatr* 2000; 89: 18-21; Lucassen, P L J B, Assendelt, W J J, Gubbels J W, van Eijk J T M, Douwes A C. Infantile colic:crying time reduction with a whey hydrolysate: a double-blind, randomized, placebo-controlled trial. *Pediatrics* 2000; 106: 1349-1354). Many cases of colic are related to food allergy, but not all of them, that is why, intervention is much more complex than just replacing milk protein by protein hydrolyzates.

Other modifications are addressed to mitigate the potential factors triggering colic, among those are the reduction of lactose content, contribution of oligosaccharides to achieve prebiotic effect and the inclusion of higher percentage of lipids with palmitic acid attached to the beta carbon of glycerol molecule (beta palmitic acid).

Savino et al. (Savino F, Palaumeri E, Castagno E, Cresi F, Dalmasso P, Cavallo F, Oggero R. Reduction of crying episodes owing to infantile colic: a randomized controlled study on the efficacy of a new infant formula. *European Journal of Clinical Nutrition* 2006; 60: 1304-1310), evaluated the efficacy of an infant formula on the reduction of crying episodes related to infantile colic. This formula consisted of partially hydrolyzed whey proteins, oligosaccharides with prebiotic effect and high proportion of beta palmitic acid. The formula significantly reduced the episodes of crying compared to the standard formula. However, the formula lacks other nutrients commonly found in breast milk and essential for the proper development of children, such as docosahexaenoic acid (DHA), arachidonic acid (ARA), inositol, choline, taurine and carnitine, among others.

Other strategies found in the literature addressed to remedy colic events is the use of infant formula with a source of fiber and protein hydrolyzates, as described by Borschel et al. in the U.S. Pat. No. 5,021,245; however, its use in children under 6 months is questionable since it is until 6 months of age when solid foods such as cereals, fruits and vegetables containing fiber, are included into the infant diet.

Constipation is defined as the difficulty presented by the baby to remove stool from the body, when this happens, the feces are accumulated in the intestines. The delay in the intestines movement extends the time feces remain in them. Therefore, this causes that the body may reabsorb the liquid contained in stools, turning feces drier and harder leading to more constipation.

The main cause of constipation in lactants are the dietary modifications such as the change from breastfeeding to infant formula; changes of infant formula or the inadequate preparation of formulas by dissolving improper quantities of powder, among others. It has been suggested that the change from breastfeeding to the introduction of other foods, plays an important role in the onset of symptoms of constipation in childhood, however the mechanisms involved are unknown.

Constipation in children fed with infant formula, may be the result of the presence of calcium soaps in the stool, which hardly occurs in breastfed children. Lipids of breast milk have a 70% of palmitic acid attached to the beta carbon of the glycerol molecule, higher than those usually found in infant formulas currently used.

Palmitic acid attached to the alpha carbon of the glycerol molecule remain released in the intestine, bind to calcium molecule and precipitate, thus they are not absorbed but they also harden the stools. The addition of lipids with beta palmitic acid makes softer stool and promote the absorption of lipids and divalent metals such as magnesium and calcium. Other potential modifications that favor the treatment of constipation include the addition of oligosaccharides, supplementation with long chain fatty acids and the addition of partially hydrolyzed protein.

Infant formulas with one or more of the aforementioned characteristics are commercially available, that help relieve constipation. Within them we can mention Blemil Plus 1 and 2, Novalac AE, Nutriben 1 and 2, and Sanutri 1 and 2.

Bindels et al. (U.S. Pat. No. 6,863,918 B2) describe an improved infant formula, which reduces constipation and gastrointestinal disorders. That formula is composed by prebiotics, a viscosity modifying agent, also a portion of protein hydrolysates, preferably from serum. Additionally, the formula contains at least one easy-digestible lipid component and at least one endo or exo proteinase. However, the composition of such patent it is limited in terms of content of other nutrients essential for the proper development of children. Moreover, this formulation does not contain potato starch as a thickening agent, so it does not produce the benefits that its inclusion represents.

On the other hand, research aimed to develop infant formulas has been focused in obtaining a protein profile similar to the one found in breast milk, mainly the whey fraction, in order to reduce adverse events.

In this respect, Kuhlman et al. in U.S. Pat. No. 6,913,778 B2, disclosed an infant formula on which protein is obtained from whey, which 40% or less of the total protein is alpha-lactalbumin and 8% is beta-lactoglobulin. On the other hand, Davis and Kuhlman (US Published Application No. 2005/0142249 A1), describe a method for reducing the side effects observed when infants are fed with infant formula. Said method consists in administering a composition where cow's milk provides between 1.0 and 1.2 grams of protein per 100 kcal, plus a certain amount of whey that provides between 1.0 and 1.2 grams of protein per 100 kcal. The whey used in such formulation contains from 28 to 40% of alpha-lactoalbumin and from 8 to 33% of beta-lactoglobulin. These formulas have been successful in decreasing adverse events associated with the consumption of milk formulas, although they are deficient in some other components necessary to reduce colic and reflux episodes, such as thickening agents, prebiotics, lipids with palmitic acid in the beta position, and other components essential for a proper development such as DHA and ARA.

The developments in the area of infant formulas performed to date are plenty but there is no formula or method of treatment that optimally reduces gastro-esophageal reflux, colic and constipation, symptoms that usually occur simultaneously in the newborns. The invention described below describes a novel infant formula for the simultaneous treatment of these three conditions.

BRIEF SUMMARY OF THE INVENTION

Among the goals of the present invention are to provide a nutritional composition for use as feed formula for children aged 0-12 months. The composition of the invention also has a greater tolerance and significantly decreases the adverse events produced with other existing formulations.

The present invention provides a nutritional composition for use in the feeding of children who have gastro-esophageal reflux or regurgitation, colic and/or constipation, that at the same time, is useful as the sole source of nutrition and also reduces and treats these conditions.

Additionally, the present invention provides a a nutrient composition that in addition to provide the aforementioned benefits, have a suitable composition of nutrients and beneficial substances to guarantee good physical and mental development.

BRIEF DESCRIPTION OF THE DRAWINGS/FIGURES

FIG. 1 depicts mean weight gain of subject infants on a formula of the present invention versus a standard infant formula.

Figure 2:
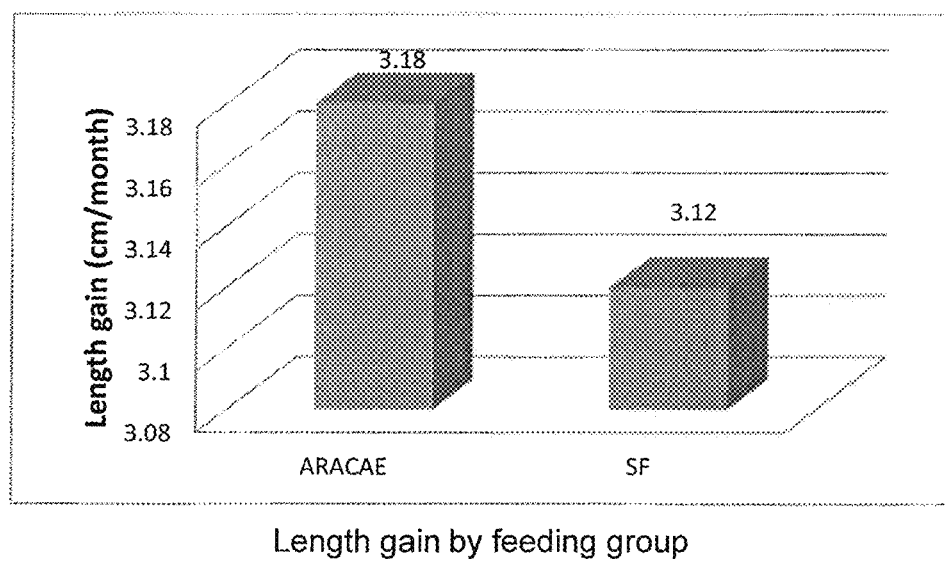
Figure 3:
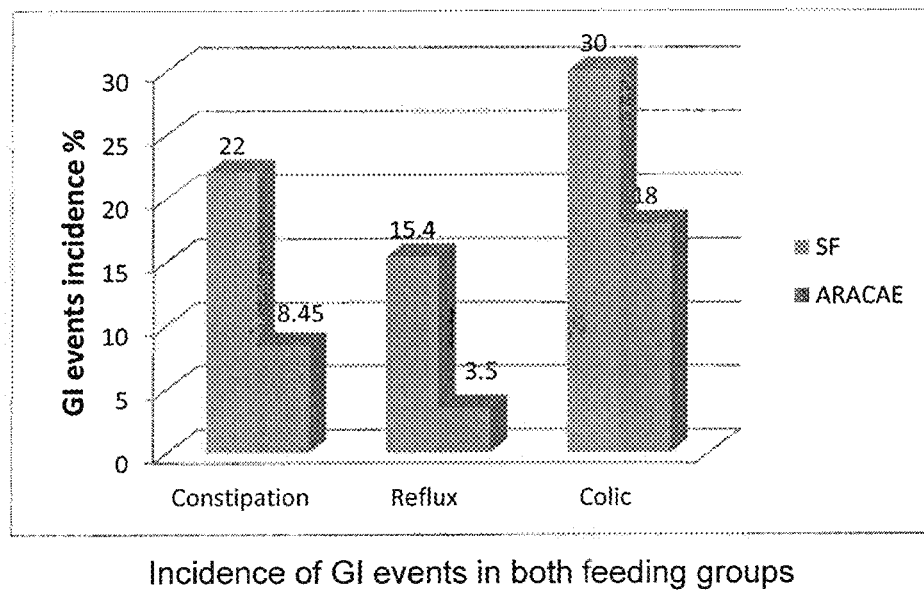

FIG. 2 depicts mean length gain (baseline to week 8) of subject infants on a formula of the present invention versus a standard infant formula FIG. 3 describes the incidence of infants that experienced reflux, colic and constipation when fed a formula of the present invention versus a standard infant formula. The incidence of constipation (SF 22%; ARACAE 8.45); reflux (SF 15.4; ARACAE 3.5) and colic (SF 30%; ARACAE 18.5%) were lower in the ARACAE group than in the SF group. SF=standard formula; ARACAE is an embodiment of the invention.

DETAILED DESCRIPTION OF THE INVENTION

Breast milk is the preferred method for infant feeding during the first four to six months of life. When breast feeding is not possible or there is a contraindication we should appeal to the Infant Formula feeding, whose composition is recommended and regulated by various committees in Mexico and in foreign countries, with the purpose of ensuring the infant's nutritional needs.

Generally, these formulas are well accepted, but a significant percentage of users suffer from some sort of gastrointestinal disorder due to illness or composition of the formula. A high proportion of children experience gastroesophageal reflux or regurgitation; colic also occurs due to reflux or other causes including intolerance to components of the formula. Changes may also occur in gastric emptying and constipation. In most of cases more than one of these symptoms occur simultaneously, therefore children must be fed with infant formula containing nutrients and substances needed to maintain an adequate nutritional status, proper growth and development and diminish symptoms due to colic, reflux and constipation.

The present invention related to obtaining and using an infant formula which overcomes the disadvantages and negative effects that actually occur with the use of infant formulas, especially the presence of symptoms due to reflux, colic and constipation; besides being an excellent alternative to maintain growth and development of infants.

The main disadvantage of the formulas found in the prior art is that they have been designed to remedy individually each one of the alterations that are observed with the use of infant formula. Normally two or more of the aforementioned disorders (reflux, colic, constipation and diarrhea) occur simultaneously. There is no formula in the prior art that treat simultaneously these conditions.

The formula of the invention is especially designed to reduce simultaneously the episodes of regurgitation, colic and constipation.

Additionally, a careful analysis of the currently marketed formulations shows that the nutritional profile of these products is currently limited in some nutrients which are essential for proper physical and mental development of the infant such as, DHA (docosahexaenoic acid) for brain development, ARA (arachidonic acid), for the development of the cornea, Linolenic acid which is precursor of DHA, Taurine which is an essential aminoacid during the first 6 months of age, Nucleotides which are positively involved in the metabolism of fats and bowel function, their deficiency might have unwanted effects on child development. Therefore a further advantage of the formula of the invention lies in its nutritional composition, since it was especially designed to simulate as much as possible to breast milk and thus ensure the proper development of the infant.

Certain differing properties of the composition of the invention are the following:

It is the only multi-purpose formula, which means that it was designed to relieve or reduce symptoms of reflux, colic and constipation, disorders that usually occur simultaneously in children who consume any formula.

In a liquid or reconstituted form, the protein content in the formula is 1.8 g/dL in order to be similar to that of breast milk, current infant formulas have a protein content ranging from 2.4 to 2.8 g/dL, thereby causes a metabolic stress in the kidney, the organ by which the urea, product of protein metabolism, is excreted. The ratio of casein: whey proteins normally found in infant formulas is 80:20 whereas in mature human milk this ratio is 40:60. The composition of the present invention has a similar protein relationship to that of breast milk, and also maintains adequate amounts of all essential amino acids. This composition significantly reduces milk intolerance and adverse effects such as colic, constipation and reflux that arise with the use of formulas that currently exist.

In the composition of this invention alpha-lactoalbumin content with respect to total protein range from 16 to 25%, unlike existing formulas which contain about 11%. The composition of the current invention also presents higher concentrations of tryptophan, cysteine and cystine. These changes altogether reduce protein allergy.

The composition of the invention is also characterized by having a higher percentage of beta-casein A2 than the normal cow milk-based formulas. In normal cow milk-based formulas, from total beta-casein, not more than 1% is found as A2 form, whereas in our formula more than 2% of total beta-casein is found as beta-casein A2 form. Beta-casein is a major protein in the milk casein, being about 30% of cow's milk. Two isoforms of beta-casein have been identified according to their structural difference, namely A1 and A2, this structural difference affects the proteolytic process. When in milk exists more abundantly the structure A1, a bioactive peptide, beta casomorphin is produced. Beta casomorphin is involved in the tendency to promote the oxidation of LDL, heart disease, which affects the regulation of insulin formation, increased allergenicity and disorder of the digestive process.

The formula of the present invention is designed with potato starch as a thickening agent for relieving reflux symptoms. Starches are polysaccharides composed of two parts: amylose in a range from 20 to 30% and amylopectin in a range from 80 to 70%. Amylopectin is less digestible than amylose, corn starch and rice starch contain more amylopectin and thus are less digestible. Potato starch has a concentration of amylose ranging from 50 to 70% and 50 to 30% of amylopectin, so it is more tolerable, digestible and less allergenic, therefore it has fewer risk of allergies, fewer reflux events and episodes of constipation. Unlike other antireflux formulas, in the present formulation, the use of gums as thickening agents has been eliminated, in order to prevent its interaction with divalent ions, such as calcium and magnesium, which may reduce their bioavailability.

In our formulation 45% of palmitic acid is found as beta palmitic acid. Palmitic acid accounts for 25% of the total fatty acids in breast milk and more than 70% of it is esterified at the 2 position of the triglyceride molecule. Until recently, all infant formulas had the palmitic acid esterified at positions 1 and 3 of the glycerol molecule. Palmitic acid esterified in these positions (1 and 3) is released during digestion and forms insoluble calcium soaps, reducing the absorption of calcium and harden stool. The presence of a higher proportion of beta palmitate in infant formulas has significant effect in reducing constipation, colic and other gastrointestinal disturbances.

The composition of the invention is enriched with oligosaccharides with prebiotic activity, mainly fructooligosaccharides and galactooligosaccharides, wherein the sum of these two components reaches a concentration between 0.3 and 0.8 g/100 mL of the reconstituted formulation. Prebiotics are ingredients that act modifying the flora in the colon, in order to stimulate the growth of beneficial bacteria to the host. These oligosaccharides form the third main component of breast milk and are considered responsible for the large amount of gastrointestinal bifidogenic flora of the breastfed infants. An increase of bifidogenic flora normally correlates with an increased resistance to infection and a decreased risk of atopic dermatitis. It is not feasible to reproduce the composition in oligosaccharides of breast milk, but the addition of mixtures of insulin, fructooligosaccharides (FOS) and oligosaccharides (GOS) to infant formula has shown prebiotic activity. Furthermore, these oligosaccharides are considered soluble dietary fiber and increase in a dose-dependent form the fecal mass, thus preventing constipation and infantile colic.

Other important changes included in the present composition, is the reduction of lactose content to avoid cramps and episodes of diarrhea in the infant. Lactose is found in a concentration about 0 to 30% of the total carbohydrate content.

The composition of the present invention is enriched with long chain polyunsaturated fatty acid (LC PUFAS), mainly DHA (docosahexaenoic acid) and ARA (arachidonic acid), which are essential for brain and nervous system development and for the optimal development of the retina in infants. Some of these compounds are included in just a few of infant formulas currently used. The composition of the invention has a content of DHA about 60 to 100 mg/100 g of the powdered formula, whereas the ARA is at a concentration from 100 to 200 mg/100 g of powdered formula.

The composition of the invention is enriched with nucleotides in the following proportions:
Adenosine monophosphate (AMP) 1.5 mg/100 kcal;
Cytidine monophosphate (CMP) 2.5 mg/100 kcal;
Guanosine monophosphate (GMP) 0.5 mg/100 kcal;
Inosine monophosphate (IMP) 1.0 mg/100 kcal; and
Uridine monophosphate (UMP) 1.75 g/100 kcal.

Nucleotides are non-protein nitrogen compounds which are part of the structure of DNA and RNA and therefore are essential for growth and also various biochemical processes involved in cellular metabolism. Human milk provides nucleotides and is believed that in periods of rapid growth exogenous nucleotides can save endogenous metabolic production and promote immunity. Studies conducted in formula fed infants, supplemented with nucleotides show a lower incidence of infectious diarrhea, enhanced immune response to vaccines and in the case of low weight birth, the growth is improved.

Example 1

Preparation of an Infant Formula Powder and Reconstitution

An infant formula of the present invention was prepared by mixing the following ingredients in amounts based upon 100 g of total powder or dry ingredients. Table 1 shows a nutritional composition per 100 grams of the formula of the invention.

| Ingredient | Amount per 100 g powder | Unit |
| --- | --- | --- |
| Energetic Content | 497 | Kcal |
| Protein | 12.8 | G |
| Carbohydrates | 58 | G |
| Lactose (25%) | | |
| Maltodextrin (50%) | | |
| Potato starch (25%) | | |
| Lipids | 23.8 | G |
| Sodium | 175 | mg |
| Potassium | 500 | mg |
| Calcium | 420, Max. 430 | mg |
| Vitamin C | 70 | mg |

-continued

| Ingredient | Amount per 100 g powder | Unit |
|---|---|---|
| Linoleic acid | 4.8 | G |
| Linolenico acid | 440 | mg |
| Phosphorus | 220-290 | mg |
| DHA | 85 | mg |
| ARA | 170 | mg |
| Nucleotides | 24.1 | mg |
| Thiamine | 450 (Max. 450) | µg |
| Pyridoxine | 400 | µg |
| Calcium pantotenat | 2.2 | mg |
| Cyanocobalamin | 1.5 | µg |
| Folic acid | 70 | µg |
| Riboflavin | 500 | µg |
| Nicotinamide | 4.9 | mg |
| Inositol & | 53 | mg |
| Biotin | 15 | µg |
| Vitamin K | 0.04 | mg |
| Vitamin E | 8.2 | mg |
| Choline | 60 | mg |
| Carnitine | 10.0 | mg |
| Taurine | 60 | mg |
| Vitamin D3 | 8.5 | µg |
| Vitamin A | 520 | µg |
| Magnesium | 51 | mg |
| Chloride | 329 | mg |
| Iron | 6.0 | mg |
| Zinc | 4.9 | mg |
| Copper | 0.330 | mg |
| Manganese | 0.050 | mg |
| Iodine | 0.052 | mg |
| Selenium | 0.017 | mg |
| Fructooligosaccharides | 0.533 | g |
| Galactooligosaccharides | 4.79 | g |
| Beta palmitic acid | 1.8 | g |

Proper preparation is obtained by mixing 14.5 g of powder with enough water to achieve a final volume of 100 mL This gives a protein concentration of 1.8 g of protein/100 mL, very similar to that found in breast milk. The amount of powder and liquid can be varied as long as the total amount of protein is between 1.5 to 3.0 g, preferably about 1.8 g per 100 mL liquid upon forming of the liquid formula.

The protein sources used are skim milk, concentrated protein isolated from whey, alpha-alactoalbumin, and casein, thereby obtaining a casein:protein whey ratio of 40:60.

The sources of protein used, provide about 18% of total protein as alpha-lactoalbumin and less than 7% as beta-lactoglobulin.

Carbohydrates provide 46% of the total energy of the formula, and the carbohydrate fraction consists of lactose, maltodextrin and potato starch.

Potato starch contributes with 25% of total carbohydrates and acts as thickening agent to reduce episodes of regurgitation. The maximum lactose concentration in the composition is 25% of total carbohydrates in order to reduce colic and diarrhea.

Lipids provide about 47% of the total energy in the formula. Lipid sources used in the composition of the invention are corn oil and soybean oil, among others.

In the composition, as a source of beta palmitate a mixture of plant and animal triglycerides is used, thereby obtaining a concentration of palmitic acid esterified on the beta position of the glycerol molecule that reaches 45% of total palmitic acid in the composition.

Example 2

Evaluation of Infant Formula (ARACAE) Containing High Concentration of Beta Palmitic Acid, a Mixture Of Prebiotic Oligosaccharides, Low Lactose, and Alpha-lactoalbumin Methods A pilot study was undertaken to compare the efficacy in growth and gastrointestinal tolerability of infants fed on an standardized whey dominant infant formula (whey:casein 60:40; SF) and a formula containing high concentration of beta palmitic acid, a mixture of prebiotic oligosaccharides, low lactose, and alpha-lactoalbumin (ARACAE).

Forty-eight healthy term infants 5-14 days old exclusively consuming and tolerating a cow's milk infant formula were randomized to standard whey dominant formula (SF; n=24) or experimental formula (ARACAE; n=24). Primary outcome was weight gain (g/d) and secondary outcome was gastrointestinal tolerability (GI) defined by the occurrence of reflux, colic or constipation. Study events were assessed every two weeks during eight weeks.

Results

Growth velocity: Mean weight gain (baseline to week 8 g/day) did not significantly differ between ARACE vs SF. Length gain (baseline to week 8) was comparable and did not significantly differ between ARACAE vs SF. (FIG. 1 and FIG. 2).

FIG. 3 describes the incidence of infants that experienced reflux, colic and constipation. The incidence of constipation (SF 22%; ARACAE 8.45); reflux (SF 15.4; ARACAE 3.5) and colic (SF 30%; ARACAE 18.5%) were lower in the ARACAE group than in the SF group.

Conclusion

New developed infant formula containing high concentration of beta palmitic acid, a mixture of prebiotic oligosaccharides, low lactose, and alpha-lactoalbumin supported growth as well as a whey dominant infant formula; in addition the GI tolerability of the new developed formula was higher than whey dominant formula. Therefore new formula (ARACAE) may be considered as a treatment in infant with GI disturbances.

The invention has been described sufficiently to allow a person skilled in the art to reproduce and obtain the results stated herein. However, any person skilled in the technical field of the present invention may be able to make modifications not described in this application, however, if for the application of such modifications in a determined structure or in the process of manufacturing thereof is required matter claimed in the following claims, such structures must be within the scope of the invention.

Having adequately described the invention, it is considered as a novelty and therefore it is claimed as property the statement and contained in the following claims.

We claim:

1. An infant formula composition comprising, in 100 Kcal of the composition, from 1.5 to 4 grams of protein, from 8 to 16 grams of carbohydrate, from 4 to 8 grams of lipid, wherein the carbohydrate comprises from 10% to 40% potato starch based on the total carbohydrate, wherein the protein comprises alpha lactalbumin and casein, wherein the content of alpha lactalbumin is from 16% to 25% based on the total protein of the infant formula composition, and the casein comprises beta casein A1 and beta casein A2 at a ratio of about 50:50, wherein the lipid comprises from 10% to 50% palmitic acid based on the total lipid, and wherein 45% of the palmitic acid is beta palmitic acid.

2. The infant formula composition of claim 1, wherein the content of alpha lactalbumin is about 18% based on the total protein of the infant formula composition, and wherein the content of beta casein A2 is more than 2% based on the total beta casein of the infant formula composition.

3. The infant formula composition of claim 1, wherein the carbohydrates comprise about 25% potato starch.

4. The infant formula composition of claim 3 comprising about 2.5 grams protein, about 11.7 grams carbohydrate, and about 4.8 grams lipids.

5. The infant formula composition of claim 4 wherein the carbohydrate further comprises about 25% lactose based on the total carbohydrate of the infant formula composition.

6. The infant formula composition of claim 5 further comprising at least one component selected from the group consisting of corn starch, xanthan gum, locust bean gum, carboxymethylcellulose, non-digestible oligosaccharide, long chain polyunsaturated fatty acid, nucleotide, vitamin, mineral, inositol, choline, taurine, and carnitine.

7. The infant formula composition of claim 6, wherein the nucleotide is selected from the group consisting of Adenosine monophosphate (AMP), Cytidine monophosphate (CMP), Guanosine monophosphate (GMP), Inosine monophosphate (IMP), Uridine monophosphate (UMP), and a combination thereof.

8. The infant formula composition of claim 6, wherein the long chain polyunsaturated fatty acid is selected from the group consisting of docosahexaenoic acid (DHA), arachidonic acid (ARA), and a combination thereof.

9. An infant formula composition comprises, in 100 grams of dry powder, about 12.8 grams of protein, about 58 grams of carbohydrate, and about 23.8 grams of lipid, wherein the carbohydrate comprises about 14.5 grams potato starch, the protein comprises alpha lactalbumin and casein, wherein the content of alpha lactalbumin is from about 16% to 25% based on the total protein of the composition, and wherein the casein comprises beta casein A1 and beta casein A2 at a ratio of about 50:50, and the lipid comprises about 1.8 grams beta palmitic acid.

10. The infant formula composition of claim 9, wherein the content of alpha lactalbumin is about 18% based on the total protein, and wherein the content of beta casein A2 is more than 2% based on the total beta casein of the composition.

11. The infant formula composition of claim 9 wherein the carbohydrate further comprising lactose, maltodextrin, or a combination thereof.

12. The infant formula composition of claim 9 further comprising at least one component selected from the group consisting of corn starch, xanthan gum, locust bean gum, carboxymethylcellulose, non-digestible oligosaccharide, long chain polyunsaturated fatty acid, nucleotide, vitamin, mineral, inositol, choline, taurine, and carnitine.

13. The infant formula composition of claim 12, wherein the nucleotide comprises AMP, CMP, GMP, IMP, UMP, or a combination thereof at the following concentration: from 1 mg to 15 mg AMP; from 5 to 30 mg CMP; from 1 mg to 10 mg GMP; from 1 mg to 10 mg IMP; and from 1 mg to 15 mg UMP.

14. The infant formula composition of claim 13, wherein the total amount of the nucleotide or a combination thereof in the composition is 24.1 mg.

15. The infant formula composition of claim 12, wherein the long chain polyunsaturated fatty acid comprises from about 60 mg to 100 mg DHA, from about 100 mg to about 200 mg ARA, or a combination thereof.

16. The infant formula composition of claim 12, wherein the non-digestible oligosaccharide is selected from the group consisting of fructooligosaccharide, galactooligosaccharide, and a combination thereof.

17. The infant formula composition of claim 12, wherein the vitamins and minerals are selected from the group consisting of sodium, potassium, calcium, phosphorus, chlorine, magnesium, manganese, iron, copper, zinc, selenium, iodine, vitamin A, C, D, E, K, vitamin B1, vitamin B2, vitamin B6, vitamin B12, niacin, pantothenic acid, and a combination thereof.

18. The infant formula composition of claim 12, wherein the inositol is from about 10 mg to about 100 mg, the cholie is from about 10 to 100 mg, the taurine is from about 10 mg to about 100 mg, and the carnitine is from about 1 mg to about 50 mg.

19. A reconstituted infant formula comprising 14.5 grams of the infant formula of claim 9 and water to a final volume of 100 ml.

20. The infant formula composition of claim 1, wherein the composition is a sterile ready to use liquid composition.

21. The infant formula composition of claim 9 comprising, in 100 grams of dry powder, the following components:

[REMOVE TABLE]

12.8 g protein,
58 g carbohydrates, wherein the carbohydrates comprise, based on the total amount of the carbohydrates, 35% lactose, 50% maltodextrin and 25% potato starch,
23.8 g lipids,
175 mg sodium,
500 mg potasium,
from 420 mg to 430 mg calcium,
70 mg vitamin C,
4.8 g linoleic acid,
440 mg linolenic acid,
from 220 to 290 mg phosphorus,
85 mg DHA,
170 mg ARA,
24.1 mg nucleotides,
450 μg thiamine,
400 μg pyridoxine,
2.2 mg calcium pantothenate,
1.5 μg cyanocobalamin,
70 μg folic acid,
500 μg riboflavin,
4.9 mg nicotinamide,
53 mg inositol,
15 μg biotin,
0.04 mg vitamin K,
8.2 mg vitamin E,
60 mg choline,
10 mg carnitine,
60 mg taurine,
8.5 μg vitamin D3,
520 μg vitamin A,
51 mg magnesium,
329 mg chloride,
6.0 mg iron,
4.9 mg zinc,
0.330 mg copper,
0.050 mg manganese,
0.052 mg iodine,
0.017 mg selenium,
0.533 g fructooligosaccharides,
4.79 g galactooligosaccharides,
1.8 g beta palmitic acid.

* * * * *